UNITED STATES PATENT OFFICE.

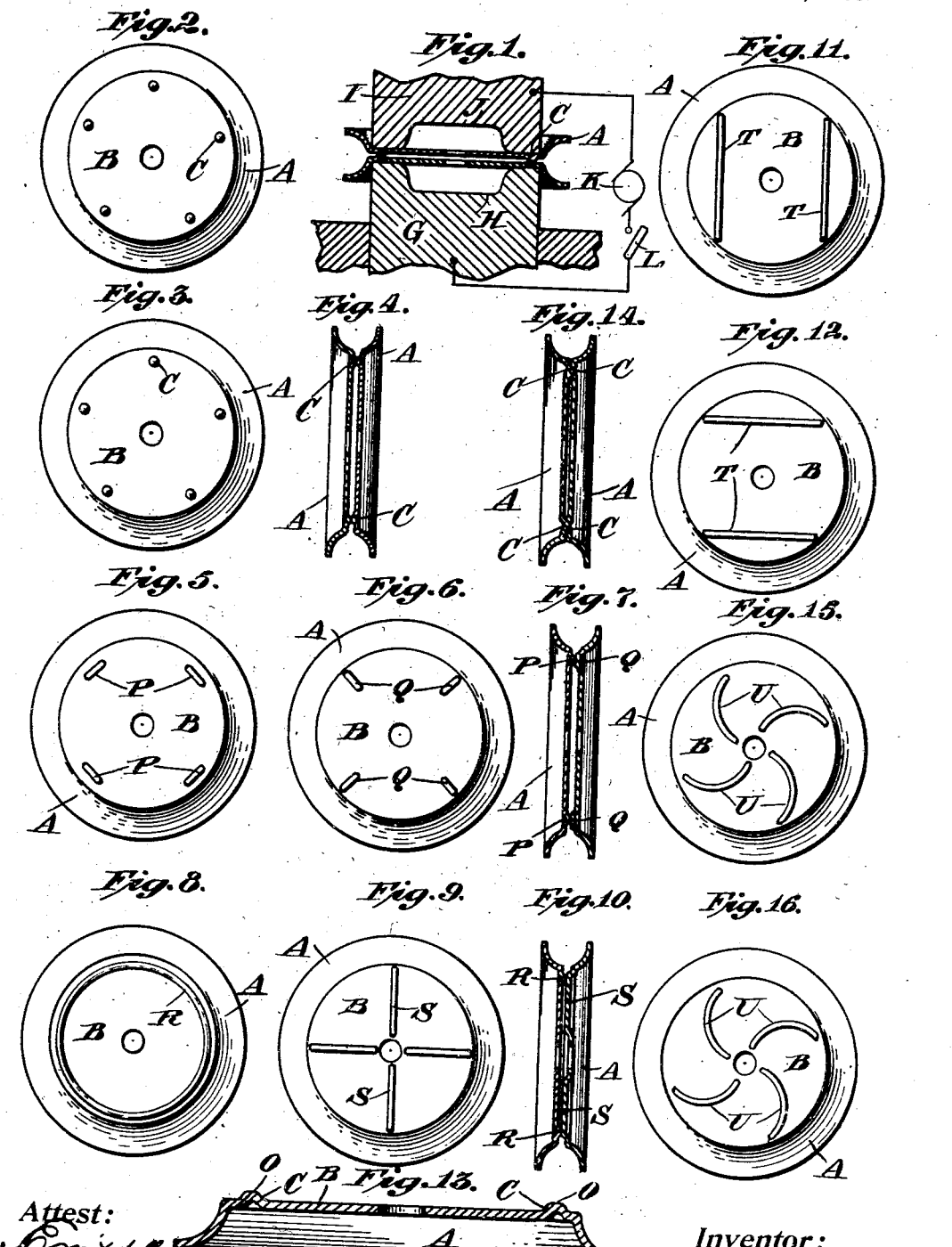

LAURENCE S. LACHMAN, OF NEW YORK, N. Y., ASSIGNOR TO STANDARD PULLEY MANUFACTURING COMPANY, A CORPORATION OF NEW YORK.

PROCESS OF ELECTRIC WELDING.

No. 904,540.

Specification of Letters Patent.

Patented Nov. 24, 1908.

Application filed March 24, 1905. Serial No. 251,712.

*To all whom it may concern:*

Be it known that I, LAURENCE S. LACHMAN, a citizen of the United States, and resident of the borough of Manhattan, city, county, and State of New York, have invented certain new and useful Improvements in Processes of Electric Welding, of which the following is a specification.

The invention relates to an improved process of electric welding, for welding two sheets of metal together.

The invention may be applied to the construction of pulleys, wheels, sheaves, pulley frames and other structures, whereby the parts of the structures may be securely united to each other by an autogenous union without the use of rivets, bolts, keys, and without interlocking connections.

While I have specified certain named devices to which the invention relates, and to which the process is particularly applicable, I am nevertheless not to be understood as limiting this invention to such devices, because the process may be used in any connection to which it is applicable.

Further objects of the invention will hereinafter appear, and to these ends the invention consists of the process of electric welding for carrying out the above objects, embodying the steps as hereinafter fully described and as claimed in this specification.

Suitable apparatus for carrying out the process is illustrated in the accompanying drawings, in which Figure 1 is a vertical sectional view of a suitable die or press and the parts of a sheet metal wheel or pulley which are to be welded together electrically. Figs. 2 and 3 are inside face views of the parts of the wheel or pulley to be welded together. Fig. 4 is a vertical sectional view of the parts of the pulley arranged in juxtaposition. Figs. 5 and 6 are inside face views of wheel or pulley parts which may be welded together. Fig. 7 is a vertical sectional view of said parts placed in juxtaposition. Figs. 8 and 9 are inside face views of coöperating portions of a wheel or pulley to be welded together. Fig. 10 is a vertical sectional view of the same placed one against the other. Figs. 11 and 12 are inside face views of the coöperating parts of a pulley, to be welded together. Fig. 13 is an enlarged detail sectional view of the portion of the pulley shown in Fig. 2. Fig. 14 is a vertical sectional view of the complete pulley after the parts have been welded together. Figs. 15 and 16 are inside face views of coöperating portions of a wheel or pulley to be welded together.

According to this improved process, two sheet metal portions of the final product are welded to each other electrically, whether the two sheet metal portions referred to form the parts of a pulley or wheel, the different parts of a frame, or tool, or utensil, or other sheet metal structure.

In the drawings I have illustrated the process as applied to welding together the two coöperating portions of a sheet metal wheel or pulley, although other devices might have been shown to illustrate the process. Each half of the pulley is provided with a flanged portion A and body portion B of any desired form, which may be pressed out of sheet metal.

In welding the two portions of the wheel together in any of the forms illustrated in the drawings, isolated points of contact projecting out of the general plane or surface of the metal and each having a much larger area of such surface adjacent thereto, are provided between the portions of the wheel, and the metal at the projecting points of contact is welded together. In uniting metal bodies provided with protuberances, it is necessary that the welding current employed should be great enough to heat the protuberances to a welding condition and it is also necessary that the protuberances on each body should have a sufficient area of adjacent metal to short-circuit the current, or reduce the effective heating developed by the current, so that when the protuberances are forced together and such adjacent surfaces of metal meet and contact there is afforded a larger path for the passage of current, thereby reducing the heat generated by the current below a welding temperature.

In Figs. 2, 3 and 4, each half of the wheel is provided with projections C which may be formed in any desired manner, as for instance, by being forced or pressed from the body portion B. These projections C may also be formed by cuts or slits, or pieces of metal punched from the body portion. One portion of the metal is laid upon the other portion as illustrated in Fig. 1, with the projections C in contact with each other,—that is to say, the projections C of one portion of the wheel bear directly upon the projections C of the other portion of the wheel. G represents the bed of a die or press, the die portion of which is hollowed at H to receive one half of the wheel. The punch I is also hollowed out at J to receive the upper half of the wheel, but the outer portions of the die and punch are adapted to bear upon the portions of the body of the wheel directly in the rear of the flanges A and over the projections C.

By way of illustration, the die and punch are shown with diagrammatic electric circuits connected to a suitable source of supply or generator K having a controlling switch L. The parts of the wheel are first laid on the die H and then the punch I is brought down, whereupon the electric circuit will be completed as soon as the punch comes in contact with the upper half of the wheel. The circuit is completed through the projections C on the parts of the wheel which are in contact with each other, and with a current of the proper strength, the projections C will be brought to a welding condition at their contacting terminals. The pressure of the punch I is continuously applied as the projections C soften, thereby forcing the two parts of the wheel together and as soon as the welding is complete and the projections have coalesced to form integral, spot welds, the current is switched off, development of welding heat having ceased with the meeting and contacting of the larger areas of metal adjacent to such projections as the projections flatten down. Suitable contacts may be provided on the parts of the press, which will automatically complete an electric circuit for breaking the circuit at the switch L at the proper time, as for example when the plane faces of the plates meet.

As shown in Fig. 13, the projections C are preferably provided with flattened points O in order that projections of one half of the wheel may better bear upon the projections of the other half.

In Figs. 5, 6 and 7, elongated peripheral projections P are provided upon one half of the wheel, while elongated radial projections Q are provided upon the other half of the wheel, and these peripheral and radial projections P and Q are arranged so that when one portion of the wheel is arranged opposite the other, the projections Q will cross the projections P, as indicated in Fig. 7, so that there will be intersecting points of contact between the projections on the two halves of the wheel. When the current is passed through the two portions of the wheel, heat is concentrated at the points of contact between the projections P and Q and a firm weld is obtained by the coalescence of the softened metal at the points of contact, the portions of these linear projections beyond the point of intersection upon such coalescence coming into contact with the plane faces of the opposing wheel portion and offering a greater path for the passage of the current so that development of welding temperature ceases.

In Figs. 8 and 9, one portion of the wheel is provided with a circular ridge or projecting flange R, while the other portion is provided with radial projections S which are adapted to cross the circular ridge R when the two parts of the wheel are laid together and thus form points of contact, as illustrated in Fig. 10.

In Figs. 11 and 12, the portions of the wheel are provided with elongated ridges or projecting portions T which coöperate in such manner as to cross each other when the parts of the wheel are laid opposite each other, thereby forming points of contact.

In Figs. 15 and 16, each portion of the wheel is provided with curved ridges or projections U, which coöperate to form points of contact, the ridges of one portion of the wheel crossing those of the other portion of the wheel when the two parts are laid together.

The object in all of the constructions shown and described is to obtain small points of contact between projecting portions on each part of the wheel or other sheet metal part to be welded. By this means the heat is concentrated on the projecting portions of the sheet metal parts, thereby producing a series of isolated autogenous spot welds.

I claim and desire to obtain by Letters Patent the following:—

1. The process of producing autogenous spot welds which consists in providing metal bodies with a plurality of spaced and isolated integral protuberances rising from and above the surfaces to be united, placing such bodies with said protuberances in end-to-end contact, and passing a welding current through the engaging protuberances while simultaneously pressing the bodies together until each pair of protuberances coalesce to form an autogenous spot weld between such bodies and such surfaces meet and contact thereby affording a larger path for said current and reducing the generated heat below a welding temperature.

2. The process of uniting metal sheets by a plurality of autogenous spot welds which consists in providing each such sheet with a plurality of spaced and isolated integral projections rising from and above the plane of such sheet, the distances between protuberances being greater than their diameter, placing two such sheets together with their protuberances in end-to-end contact, and passing a welding current through the engaging protuberances while simultaneously pressing the sheets together until each pair of protuberances coalesce to form an isolated autogenous spot weld between the sheets and larger surfaces of metal adjacent the point of contact in each body mutually meet and contact, thereby affording a larger path for said current and reducing the generated heat below a welding temperature.

3. The process substantially as herein described of electrically welding the flat imperforate surface of one piece of thin sheet metal to the flat imperforate surface of another at a multiplicity of separated and distinctly isolated points between such flat surfaces, which consists in first producing series of projections integral with the sheets upon the surface of each sheet, separated from each other by areas of flat metal and so spaced that the projections on one sheet will register with those on the other sheet, and form coöperating points or surfaces of contact rising from and above the plane of the sheet, then placing the flat surfaces of the sheets together with the projections on one sheet in end-to-end contact with the projections on the other sheet, and finally passing an electric current through the sheets and the said projections on both sheets, thereby bringing the projections to a welding condition and simultaneously pressing the surfaces of the two sheets together until the engaging projections coalesce and sink down and the flat metal areas meet and contact affording a larger path for the current, reducing the generated heat below a welding temperature, whereby the two sheets become firmly welded together face to face by a plurality of isolated spot welds.

4. The process of electric welding which consists in providing each of two metal bodies to be united with an isolated projection having an adjacent area of metal, placing said projections in contact, and passing through said bodies a welding current of strength sufficient to bring the contacting areas of said projections to a welding temperature while insufficient to bring said adjacent areas to a welding temperature, passage of said current being continued until the engaging areas of the projections coalesce and unite and corresponding adjacent metal areas on the two bodies meet and contact and thereby offer a wider path to said current and generation of welding heat ceases.

5. The process of electric welding which consists in providing each of two metal bodies to be united with an isolated projection rising above the general surface of such body and of small cross-section compared to an area of adjacent metal, placing such projections in end-to-end contact, passing a welding current of sufficient strength to raise such projections to a welding temperature while insufficient so to heat such adjacent metal, and forcing the two bodies together until the projections weld and coalesce and such adjacent metal of the two bodies contacts and development of welding heat ceases.

6. The process of welding two metal bodies together which consists in forming on the surfaces of such bodies isolated protuberances elevated above such surfaces, contacting such protuberances end to end, passing through such bodies a welding current of sufficient volume to heat such projections to a welding condition while insufficient to heat materially a conductor of a cross-section corresponding to such metal surface and pressing said bodies together while continuing the passage of such current until said protuberances weld and coalesce and such surfaces meet to form said conductor of larger cross-section.

7. The process of electric welding which consists in forming upon the bodies to be united isolated protuberances, placing such protuberances in contact, passing through such bodies a welding current of sufficient volume to heat the point of contact to a welding temperature while insufficient so to heat adjacent metal and pressing said bodies together while continuing the passage of current until the metal at the point of contact of the two bodies softens and coalesces and adjacent metal of the two bodies comes into contact offering the current a conductor of too large section to be heated to a welding temperature.

8. The process of electric welding which consists in providing each of two metal bodies to be united, with at least one isolated projection having an adjacent area of metal, placing the projections of the two bodies in contact and passing through said bodies a welding current of strength sufficient to bring the contacting areas of said projections to a welding temperature while insufficient to bring to a welding temperature relatively larger areas of metal immediately surrounding said contacting areas, passage of said current being continued until the engaging areas of said projections coalesce and unite and relatively larger areas of the two metal bodies adjacent each point of weld meet and contact, and offer a wider path to said current, and generation of welding heat ceases.

In testimony whereof I have signed this specification in the presence of two subscribing witnesses.

LAURENCE S. LACHMAN.

Witnesses:
A. L. O'BRIEN,
OLIN A. FOSTER.